G. W. HOYT.
BEARING LUBRICATION.
APPLICATION FILED MAR. 17, 1920.

1,371,898.

Patented Mar. 15, 1921.

Inventor
George W. Hoyt,
By Hood & Schley
Attorneys

UNITED STATES PATENT OFFICE.

GEORGE W. HOYT, OF INDIANAPOLIS, INDIANA, ASSIGNOR TO THE OAKES CO., OF INDIANAPOLIS, INDIANA, A CORPORATION OF INDIANA.

BEARING LUBRICATION.

1,371,898.

Specification of Letters Patent.

Patented Mar. 15, 1921.

Application filed March 17, 1920. Serial No. 366,646.

*To all whom it may concern:*

Be it known that I, GEORGE W. HOYT, a citizen of the United States, residing at Indianapolis, in the county of Marion and State of Indiana, have invented a new and useful Bearing Lubrication, of which the following is a specification.

It is the object of my invention to lubricate a bearing in a simple and effective manner by the inertia of the lubricant upon changes in speed in the rotating part.

Figure 1:
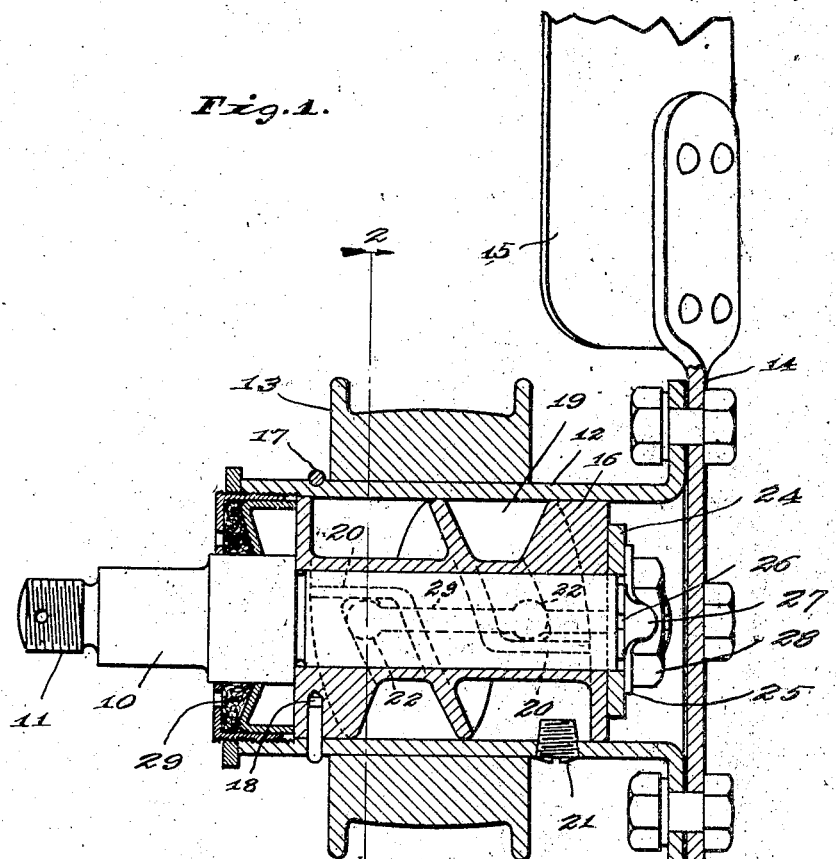
Figure 2:
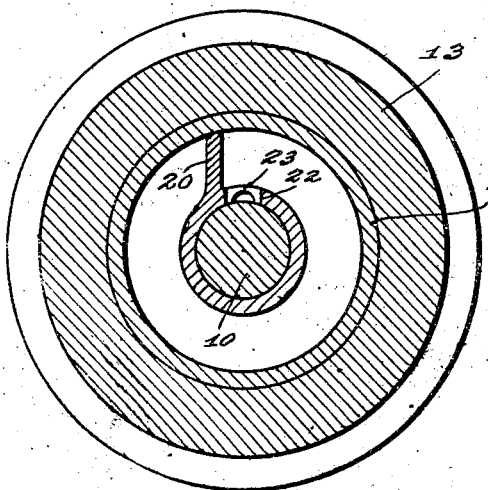
Figure 2:
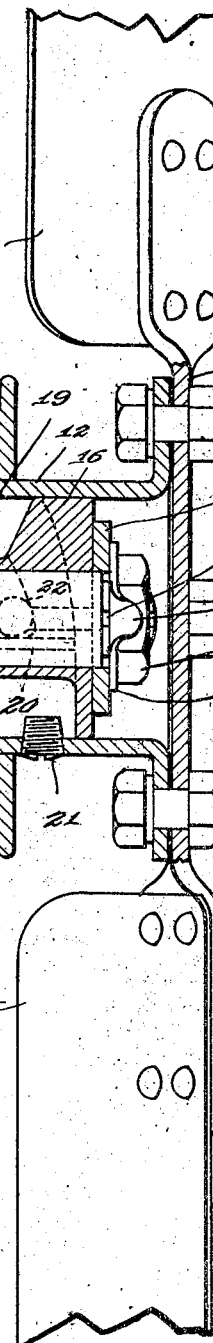

The accompanying drawing illustrates my invention: Figure 1 is a central longitudinal section through a fan mounting embodying my improved bearing lubrication; and Fig. 2 is a transverse section on the line 2—2 of Fig. 1.

The structure is supported by a stationary spindle 10, having the usual screw-threaded supporting end 11, and mounted upon this spindle is a fan hub 12 provided with the usual driving pulley 13 and at its forward end having an out-turned flange to which is bolted a spider 14 carrying the usual fan blades 15.

Within the hub 12 and between it and the spindle 10 is a bushing 16, which fits closely within the hub 12 and is fixed thereto as by a locking ring 17 surrounding the hub in a groove and having an inwardly projecting finger which takes into a hole 18 in the bushing 16. Thus the bushing 16 rotates with the hub, so that the bearing surfaces are the engaging surfaces of the bushing 16 and spindle 10.

On its outside surface the bushing 16 has a large helical passage or groove 19, which as shown makes a little more than one complete turn. This helical groove 19 has end walls 20 at its two ends, such end walls extending transversely of the groove or substantially parallel to the axis, as is clear from Fig. 1. The space provided by this helical groove 19, closed at its ends by the walls 20 and on the outside by the hub 12, constitutes the lubricant chamber, to which lubricant may be supplied through an oil-injection opening provided in the hub 12 and closed by the removable screw-plug 21. At its opposite ends, close to the two end walls 20 respectively, the bushing has two radial holes 22, which are preferably in the same axial line shown in Fig. 1, and which connect the helical groove 19 to the bearing surfaces between the bushing and the spindle. These two holes 22 are connected by a slot formed in one of the bearing surfaces, preferably on the inside surface of the bushing 16. This slot 23 is continued past the forward hole 22 to the front end of the bushing, where it communicates with the end-thrust bearing surfaces between the forward end of the bushing 16 and a thrust washer 24; this thrust washer is backed by a washer 25 held against rotation on the spindle 10 as by an inwardly extending tongue fitting into a longitudinal groove 26 in the spindle and provided with an outwardly extending finger 27 which is bent downward against one face of a clamping nut 28 to serve as a nut-lock for such nut, the nut 28 having a screw-threaded mounting on the forward end of the spindle 10 to clamp the parts in place on the spindle. The nut 28 is usually put in place before the spider 14 is attached, so that the central part of such spider, which central parts is continuous, may cover such nut and close the forward end of the hub 12.

At the rear end of the hub 12 a suitable felt washer 29 with its carrier is mounted, to provide a substantially oil-tight joint around the spindle 10 at this point.

In operation, a suitable quantity of oil is put in the helical groove 19, and when the hub 12 is rotated this oil by centrifugal force tends to lie against the inner surface of the hub 12 along such groove 19. Upon any change in speed of the hub 12, whether an increase or decrease of speed, this oil by reason of its inertia tends to move toward one or the other end of the groove, and does so move. This movement of the oil, however, is limited by the end walls 20 of the helical groove, and when the moving oil strikes either of such end walls it is directed inward thereby into the adjacent radial holes 22, with sufficient pressure to force the oil along the slot 23 to the other hole 22 and to the end-thrust bearing surfaces between the bushing 16 and thrust washer 24, the oil escaping from such other hole 22 back into the helical groove 19. Thus upon every change in speed oil is forced onto the bearing surfaces, by the inertia of the oil itself. The lubrication thus produced is found to be very effective, especially in automobile fans the speed of which is constantly changing. The effectiveness of this lubrication is largely dependent upon having the end walls 20 close to the holes 22, so that the inertia moved oil may strike such end walls and be directed thereby into the adjacent holes.

The oil is kept in the helical groove 19 at all times, and is fed therefrom through the slot 23 and back into the same helical groove 19 upon every variation in speed of the hub 12.

I claim as my invention:

1. In a bearing, the combination of a stationary supporting spindle, and a rotatable structure mounted on said spindle, said rotatable structure being provided with a helical passage having end walls and connected at its ends by holes at points close to such end walls to the bearing surfaces between said spindle and rotating structure.

2. In a bearing, the combination of a stationary supporting spindle, and a rotatable structure mounted on said spindle, said rotatable structure being provided with a helical passage having end walls and connected at its ends by holes at points close to such end walls to the bearing surfaces between said spindle and rotating structure, one of said bearing surfaces being provided with a slot connecting said holes.

3. In a bearing, the combination of a stationary supporting spindle, and a rotatable structure mounted on said spindle, said rotatable structure being provided with a helical passage connected at its ends by holes to the bearing surfaces between said spindle and rotating structure, one of said bearing surfaces being provided with a slot connecting said holes.

4. In a bearing, the combination of a stationary supporting spindle, a rotating structure having a hub rotatably mounted on said spindle and subject to end thrust, and an end-thrust member for taking the end thrust from said hub, said hub having within it a helical passage connected by holes at its ends to the bearing surfaces between the hub and spindle, said latter bearing surfaces leading to the end-thrust bearing surfaces.

5. In a bearing, the combination of a stationary supporting spindle, a rotating structure having a hub rotatably mounted on said spindle and subject to end thrust, and an end-thrust member for taking the end thrust from said hub, said hub having within it a helical passage connected by holes at its ends to the bearing surfaces between the hub and spindle, one of said bearing surfaces between the spindle and hub being provided with a slot connecting said holes together and to the end-thrust bearing surfaces.

6. In a bearing, the combination of a stationary supporting spindle, a rotating structure having a hub rotatably mounted on said spindle and subject to end thrust, and an end-thrust member for taking the end thrust from said hub, said hub having within it a helical passage connected by holes at its ends to the bearing surfaces between the hub and spindle, one of said bearing surfaces between the spindle and hub being provided with a slot connecting one of said holes to the end-thrust bearing surfaces.

In witness whereof, I have hereunto set my hand at Indianapolis, Indiana, this thirteenth day of March, A. D. one thousand nine hundred and twenty.

GEORGE W. HOYT.